(12) United States Patent
Liang et al.

(10) Patent No.: US 6,600,961 B2
(45) Date of Patent: Jul. 29, 2003

(54) INTELLIGENT CONTROL METHOD FOR INJECTION MACHINE

(75) Inventors: Jui-Ming Liang, Hsinchu Hsien (TW); Pei-Jen Wang, Hsinchu (TW)

(73) Assignee: Mirle Automation Corporation, Hsinchu (TW)

( * ) Notice: Subject to any disclaimer, the term of this patent is extended or adjusted under 35 U.S.C. 154(b) by 382 days.

(21) Appl. No.: 09/751,524

(22) Filed: Dec. 29, 2000

(65) Prior Publication Data

US 2002/0019674 A1 Feb. 14, 2002

(30) Foreign Application Priority Data

Jun. 8, 2000 (TW) ........................................ 89111158 A

(51) Int. Cl.[7] ............................................. G05B 13/02
(52) U.S. Cl. ........................... 700/48; 700/49; 700/108; 700/109; 700/200; 700/203; 706/21; 706/23; 706/904
(58) Field of Search ..................... 700/48, 49, 98, 700/108, 109, 200, 202–205; 706/21, 23, 15, 60, 45, 903, 904, 40

(56) References Cited

U.S. PATENT DOCUMENTS

| | | | |
|---|---|---|---|
| 3,893,792 A | 7/1975 | Laczko | 425/149 |
| 4,060,362 A | 11/1977 | Wilson, III | 425/145 |
| 4,311,446 A | 1/1982 | Hold et al. | 425/144 |
| 4,816,197 A | 3/1989 | Nunn | 264/40.6 |
| 4,820,464 A | 4/1989 | Sasaki et al. | 264/40.1 |
| 4,850,217 A | 7/1989 | Nunn | 73/54.11 |
| 5,246,645 A | 9/1993 | Tagawa et al. | 264/40.1 |
| 5,311,421 A * | 5/1994 | Nomura et al. | 700/37 |
| 5,473,532 A * | 12/1995 | Unno et al. | 700/32 |
| 5,477,444 A * | 12/1995 | Bhat et al. | 700/48 |
| 5,514,311 A | 5/1996 | Shimizu et al. | 264/40.1 |
| 5,997,778 A | 12/1999 | Bulgrin | 264/40.1 |
| 6,243,696 B1 * | 6/2001 | Keeler et al. | 706/21 |
| 6,249,712 B1 * | 6/2001 | Boiquaye | 700/31 |
| 2002/0052858 A1 * | 5/2002 | Goldman et al. | 706/15 |
| 2002/0087221 A1 * | 7/2002 | Keeler et al. | 700/48 |

FOREIGN PATENT DOCUMENTS

| | | | | |
|---|---|---|---|---|
| JP | 63125322 | | 5/1988 | B29C/45/77 |
| JP | 05309711 A | * | 11/1993 | B29C/45/76 |
| JP | 06114908 A | * | 4/1994 | B29C/45/77 |
| JP | 61118223 | | 6/1996 | B29C/45/50 |
| WO | WO 99/43487 | | 9/1999 | B29C/45/76 |

* cited by examiner

*Primary Examiner*—John Follansbee
*Assistant Examiner*—Crystal J. Barnes

(57) ABSTRACT

An intelligent control method for injection machine is to transplant the intelligent control and prediction techniques of a neural network to an injection machine, which has been exemplified capable of deciding the quasi best machine parameters rapidly in couple processing cycles for increasing yield with least loss, and for detecting and adjusting conditions until a desired operation environment is obtained.

6 Claims, 3 Drawing Sheets

INTELLIGENT CONTROL METHOD FOR INJECTION MACHINE

BACKGROUND OF THE INVENTION

1. Field of the Invention

This invention relates generally to an injection machine, particularly to an intelligent control method for injection machine by applying a neural network concept to control and predict quality and yield of injection products.

2. Description of the Prior Art

The quality control of an injection product usually includes two stages, namely: parameter's setting in the first stage and quality's monitoring and controlling in the second.

In the first stage, after input of predetermined injection forming parameters, such as fusion point, mold's temperature, injection pressure and speed, etc., the quality of an injection product is seemingly assurable theoretically, however, it is not the case as easy as expected for selection and input of the right parameters because of the dynamic complicatedness and the condition change going along with time of the injection process. Besides, the fused plastic material is a non-Newtonian and non-isothermal fluid suffering high pressure and high temperature in the injection process, hence, the forming parameters will normally need some correction.

For setting correct parameters, the low-efficiency trial-and-error method was generally taken to amend the parameters repeatedly until an acceptable trial run was obtained. When doing so, the engineer would rather treat it a linear relationship between the forming parameters and the quality variable parameters for amending the parameters one at a time by ignoring their real interactions. Moreover, the parameters set by the trail-and-error method may locate at the verge adjacent to a parameter window that could degrade the product quality.

Later on, an Expert System has been introduced for setting the forming parameters of the injection machine based on an "if-then" postulation, however, the Expert System is still failed in building up a more distinct qualitative relationship between the forming parameters and the quality variable parameters.

A more systematic and effective method for setting the forming parameters is a so-called Taguchi parameter design method (TPDM) capable of obtaining more information for building up an Empirical Model. Nevertheless, the TPDM is found imperfect in the fact that at least 25 forming parameters, which can affect the product quality, will affect with each other too. Thus, considerable time and manpower are required to proceed related experiments and analysis for grasping some useful factors between specified forming parameters and quality variable parameters for application only in some specified injection machines.

Because of the non-linearity of the relationship between the forming parameters and the quality variable parameters and the dynamic complicatedness and the condition change going along with time of the injection process as mentioned above, on-site quality check and control of the second stage become more important and indispensable.

For achieving this purpose, a production engineer in early days would inspect the product quality by experience, eye-measurement, and irregular check for adjusting the parameters of the injection machine and for control of the product quality. This quality control (Q.C.) method is found defective in:

training course being required to enable an operator to judge the product quality accurately; and the eye-measurement being workable for checking appearance or severe defects of the product only.

Therefore, some inconspicuous defects, such as slight cambering, deformation, chasms, remained stress, are prone to be neglected until the injected products are put under assembling.

A control method of statistical process model (SPM) is a method used for measuring process signal, evaluating product quality, and thereby building up a SPM, for example, inferring the product's measurements and weight basing on the nuzzle pressure. Nevertheless, defect of the SPM may include: considerable time, cost, and manpower being required; and no distinct qualitative relation between the forming parameters and quality variable parameters being deducible.

In the latest decade, more than one thousand inventions regarding the injection machine have been disclosed per year to prove that the injection forming technology is still under endless growing.

According to ep.espacenet.com, 173 patents relating to the process control of injection formation have been granted until now since 1970s, wherein some patents concerning this invention more or less may include:

U.S. Pat. No. 5,997,778, which is applied to obtain the dynamic response of an injection machine based on a given injection-speed curve and use the proportional-integral-differential (PID) feedback control technique to set the forming parameters for continuous control of the injection process;

U.S. Pat. Nos. 5,246,645, 5,514,311, and 4,820,464 providing switching methods of feeding control for keeping pressure;

U.S. Pat. Nos. 5,997,778, 4,850,217, and 4,816,197 for control forming quality by adjusting the interrelation among pressure, volume, temperature (PVT);

U.S. Pat. No. 4,311,446 used for forming control by comparing the auger position, speed, and temperature of fused gel with the given or expected data;

U.S. Pat. Nos. 4,060,362, 3,893,792, and W09943487 for control of forming parameters by feeding back the pressure in the feed pipe or the mold-cavity; and Japan patents No. 61118223 and 63125322 for control of forming process by regulating the auger speed.

Compared with abovesaid patens, this invention is an intelligent control method capable in both ways: setting proper forming data and inspecting control of product quality.

SUMMARY OF THE INVENTION

The primary object of this invention is to transplant the intelligent control and prediction techniques of a neural network to an injection machine, which has been exemplified capable of deciding the quasi best machine parameters rapidly in couple processing cycles for increasing yield with least loss, and for detecting and adjusting conditions until a desired operation environment is obtained.

In order to realize the object, an intelligent control method for injection machine mainly comprises the following steps:

executing a model-flow software for process simulation and comparing data with trial operations for building a qualitative-relation database comprising at least machine parameters, process parameters, and quality variable parameters;

defining a total loss function formula and according to the qualitative-relation database to calculate and obtain a data group of "Total loss vs machine parameters" and another data group of "Yield parameters vs quality variable parameters";

building an intelligent control neural network and a quality prediction neural network on the basis of the qualitative-relation database and those two data groups;

connecting the intelligent control neural network, the total loss function formula, and the quality prediction neural network together in series, wherein an output terminal of the intelligent control neural network is jointed with an input terminal of the injection machine; an input terminal of the quality prediction neural network is jointed with an output terminal of the injection machine; the intelligent control neural network is to receive the output of the total loss function formula and forward amended parameters to the injection machine; and the quality prediction neural network is to receive the output process parameters from the injection machine and forward the quality variable parameters to the total loss function formula.

For more detailed information regarding this invention together with further advantages or features thereof, at least an example of preferred embodiment will be elucidated below with reference to the annexed drawings.

BRIEF DESCRIPTION OF THE DRAWINGS

The related drawings in connection with the detailed description of this invention, which is to be made later, are described briefly as follows, in which.

DETAILED DESCRIPTION OF THE PREFERRED EMBODIMENT

An intelligent control method of this invention is to transplant the control and prediction technique of the neural network to an injection machine and take a multiple loss function of quality as an index for idealizing the intelligent control of this invention.

For realizing abovesaid objects of this invention, namely a high yield with a least total loss, after design of an injection product, the engineer is to use a computer aided engineering (CAE) model-flow software for construction of a qualitative-relation database, input of forming parameters, selection of materials, analysis of an output forming window, and suggestion of a best value of the forming parameters. Then, basing on a parameter design method, the engineer is supposed to:

take an upper and a lower threshold (referred as a parameter window hereinafter) as standard levels for proceeding analysis of CAE model-flow;

perform injection experiments and record the parameters of the injection machine in both ways;

analyze the process parameters and the quality parameters;

define a total loss function;

combine those two analyzed results and calculate the multiple loss of product quality in order to obtain two data groups, including "Loss vs machine parameters" and "Yield parameters vs quality variable parameters"; and use the data groups for training two neural networks of an intelligent control model and a quality prediction model respectively.

This invention is exemplified by simulation to be capable of setting the quasi best machine parameters rapidly in couple processing cycles to thereby increase yield with least total loss, and meanwhile, detecting and adjusting automatically in response to change with time of environment and material for keeping the yield and quality level. And theoretically, this invention is developed on the basis of the Taguchi parameter design method and the C-mold model-flow analysis software of the Cornell University, USA.

Figure 1:
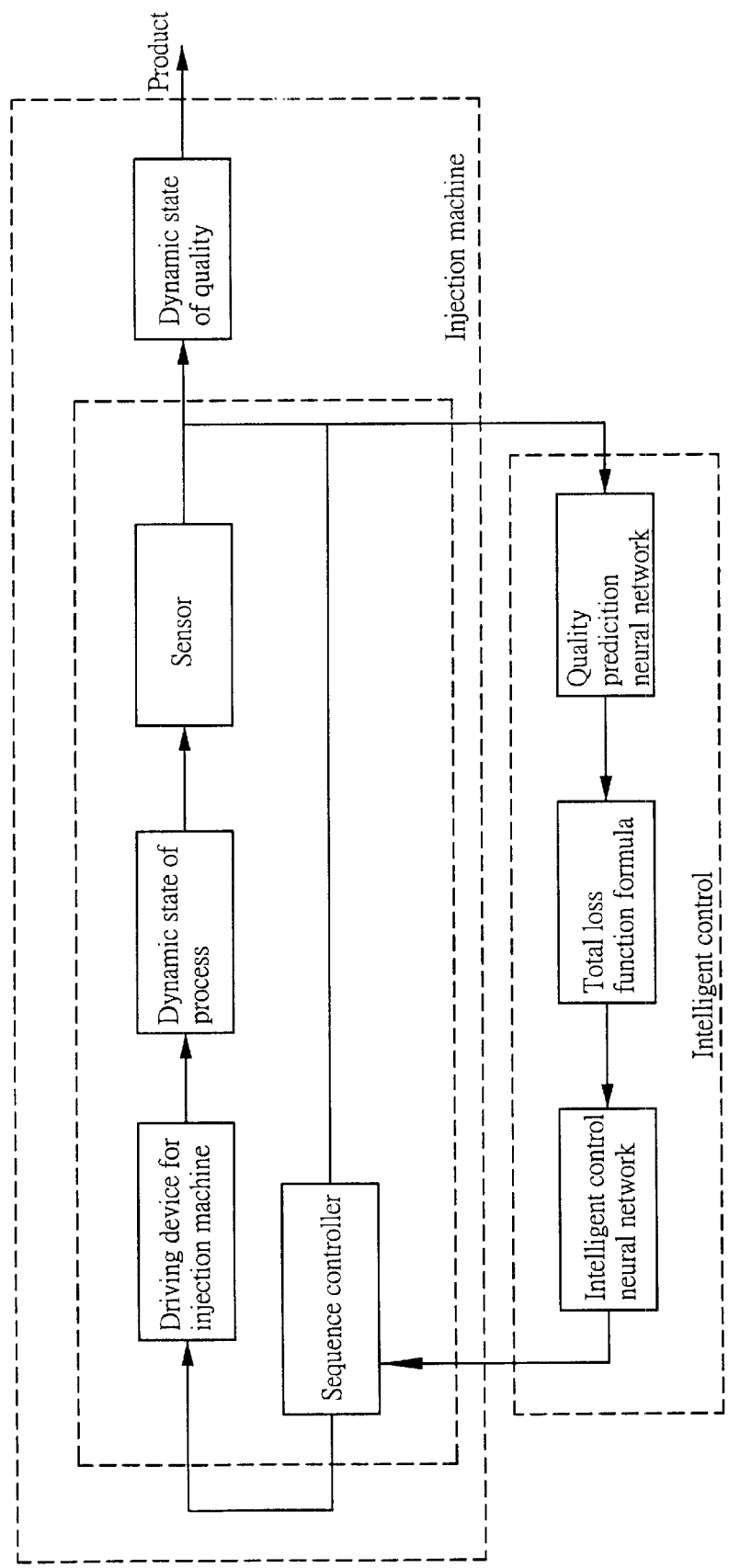
FIG. 1 is an embodiment of this invention applied in an injection machine.

In a preferred embodiment of this invention applied in an injection machine shown in FIG. 1, when the injection machine is started and after a set of parameters in the thresholds of the parameter window is provided by an intelligent control neural network, a sensor is supposed to sense and transmit a process signal for a quality prediction neural network to predict product quality of a cycle period, then for a total loss function formula to calculate the total loss in this cycle period. The intelligent control neural network will now judge and decide to offer an amended set of parameters to a sequence controller for the injection machine to proceed operation of the next cycle period. Such a control process of automatic parameter setting as well as quality monitoring is repeated cyclically until the best production environment is obtained.

In looking into abovesaid process, it is understood that the intelligent control neural network and the quality prediction neural network are built on the basis of the qualitative-relation database and those two data groups, wherein both the neural networks and the total loss function formula are coupled together in series; an output terminal of the intelligent control neural network is connected to an input terminal of the injection machine; an input terminal of the quality prediction neural network is connected to an output end of the injection machine; the intelligent control neural network is to receive an output of the total loss function formula for amendment and provide a set of amended parameters to the injection machine; and the quality prediction neural network is to receive a set of process parameters from the injection machine and relay it to the total loss function formula. In the preferred embodiment, the machine parameters include at least the injection speed, pressure-holding time, and held pressure; the process parameters include at least the feeding speed, pressure-holding time, and mold-cavity pressure; and the quality variable parameters include at least the output weight, maximum volume shrinkage, and maximum dent.

Figure 2:
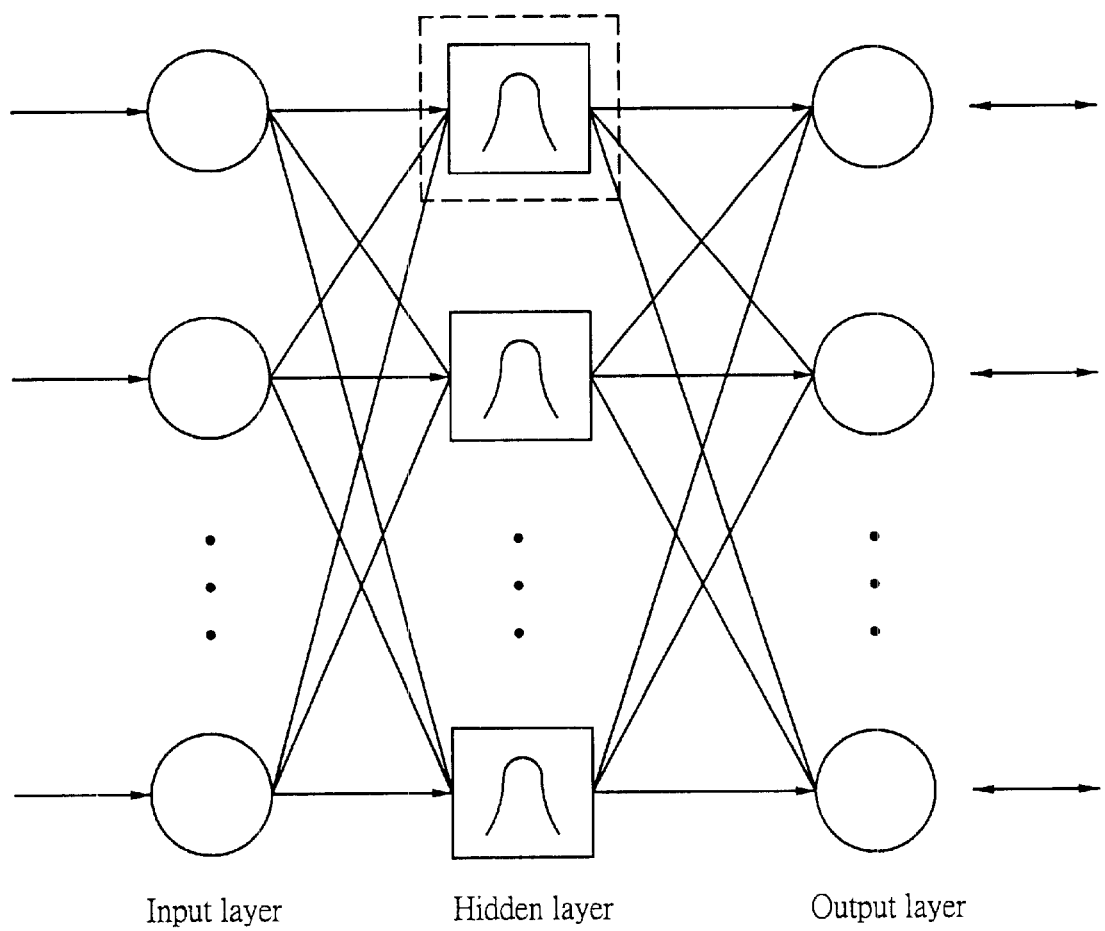
FIG. 2 shows a radiant radical function neural network of this invention.

FIG. 2 shows a radiant radical function neural network serving for the intelligent control neural network and the quality prediction neural network of this invention respectively. In the case of the intelligent control neural network, an output layer of the radiant radical function neural network acts on behalf of the output terminal of the intelligent control neural network for output of machine parameters. Similarly, an output layer of the other radiant radical function neural network acts on behalf of the output terminal of the quality prediction neural network for output of quality variable parameters to the total loss function formula while an input layer on behalf of the input terminal of the quality prediction neural network is to receive the process parameters of the injection machine.

Figure 3:
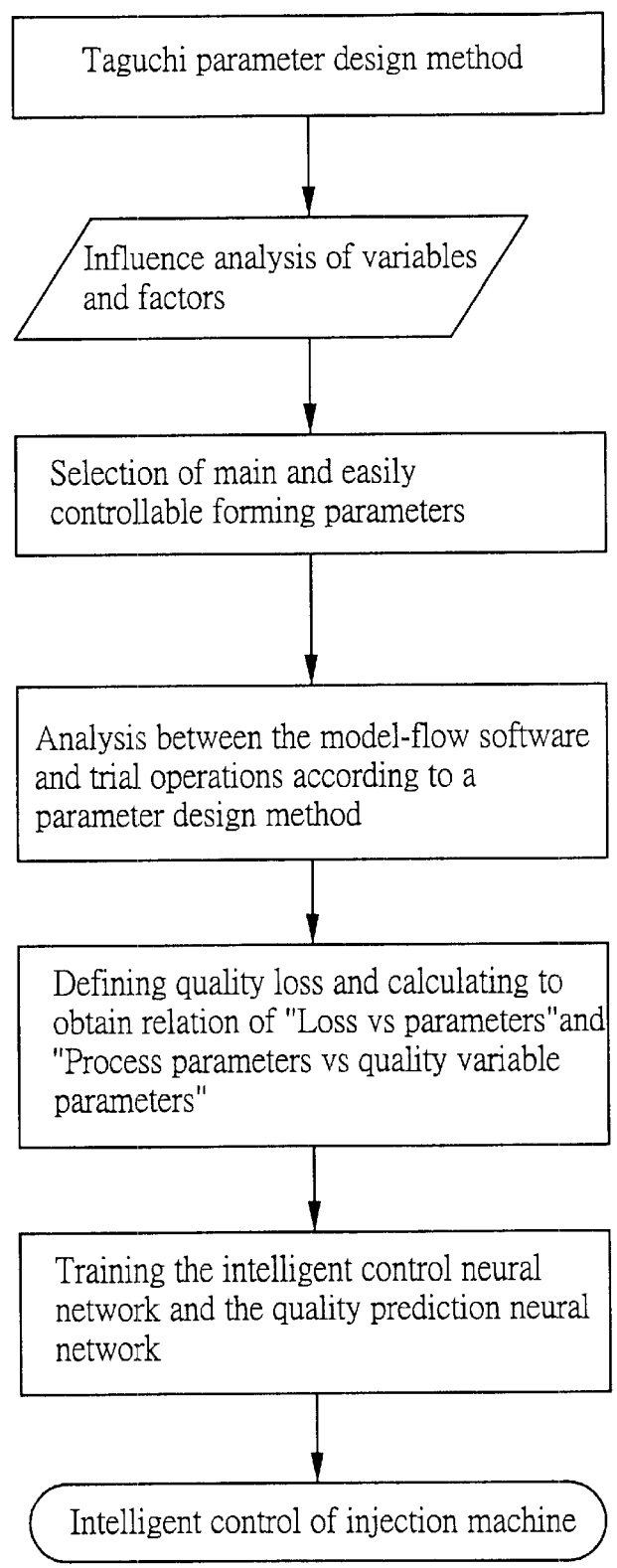
FIG. 3 shows a flowchart of an intelligent control method of this invention.

A flowchart of the intelligent control method for injection machine of this invention is shown in FIG. 3 for easy reference.

In the above described, at least one preferred embodiment has been elucidated with reference to the drawings annexed, and it is apparent that numerous variations or modifications may be made without departing from the true spirit and scope thereof, as set forth in the claims below.

What is claimed is:

1. An intelligent control method for injection machine, comprising:

executing a model-flow software for process simulation and comparing data with trial operations for building a qualitative-relation database comprising at least a plurality of machine parameters, process parameters, and quality variable parameters;

defining a total loss function formula and according to the qualitative-relation database to calculate and obtain a data group of "Total loss vs machine parameters" and another data group of "Yield parameters vs quality variable parameters";

building an intelligent control neural network and a quality prediction neural network on the basis of the qualitative-relation database and those two data groups;

connecting the intelligent control neural network, the total loss function formula, and the quality prediction neural network together in series, wherein an output terminal of the intelligent control neural network is jointed with an input terminal of the injection machine; an input terminal of the quality prediction neural network is jointed with an output terminal of the injection machine; the intelligent control neural network is to receive the output of the total loss function formula and forward amended parameters to the injection machine; and the quality prediction neural network is to receive the output process parameters from the injection machine and forward the quality variable parameters to the total loss function formula.

2. The intelligent control method according to claim 1, wherein both the intelligent control neural network and the quality prediction neural network are radiant radical function neural networks.

3. The intelligent control method according to claim 1, wherein the step of "comparing data with trial operations" is proceeded according to a parameter design method within an upper and a lower threshold of the machine parameters which is provided by the model-flow software.

4. The intelligent control method according to claim 1, wherein the machine parameters include at least the injection speed, the pressure-holding time, and the held pressure.

5. The intelligent control method according to claim 1, wherein the process parameters include at least the feeding speed, the pressure-holding time, and the mold-cavity pressure.

6. The intelligent control method according to claim 1, wherein the quality variable parameters include at least the output weight, the maximum volume shrinkage, and the maximum dent.

* * * * *